Feb. 19, 1929.

E. M. SIMONDS 1,702,854

METHOD OF PREPARING FOOD

Original Filed July 22, 1925   3 Sheets-Sheet 1

Inventor:
Edmond M. Simonds
by Wallace R. Lane,
Atty

Feb. 19, 1929.
E. M. SIMONDS
1,702,854
METHOD OF PREPARING FOOD
Original Filed July 22, 1925    3 Sheets-Sheet 2
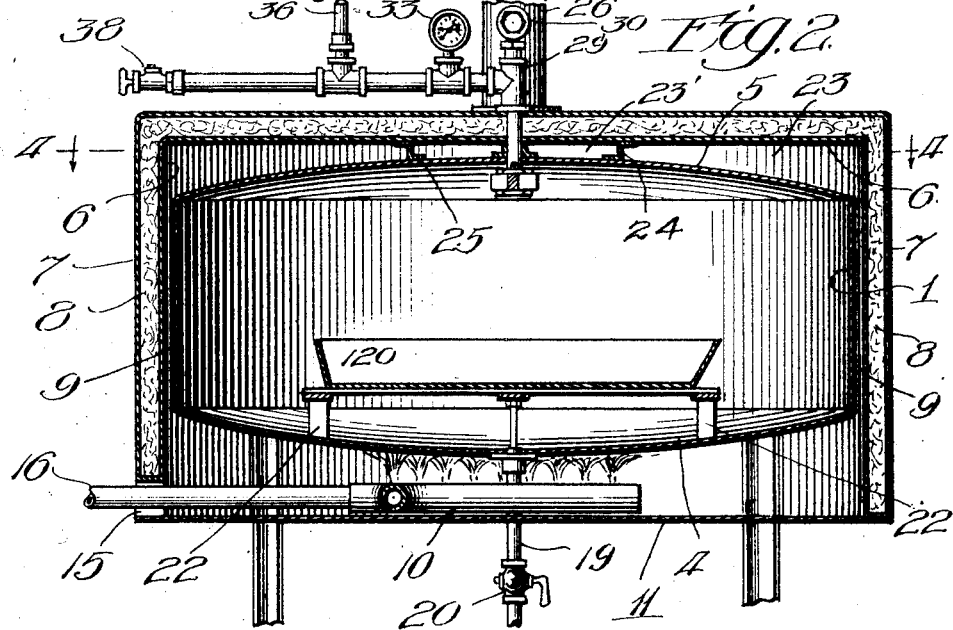
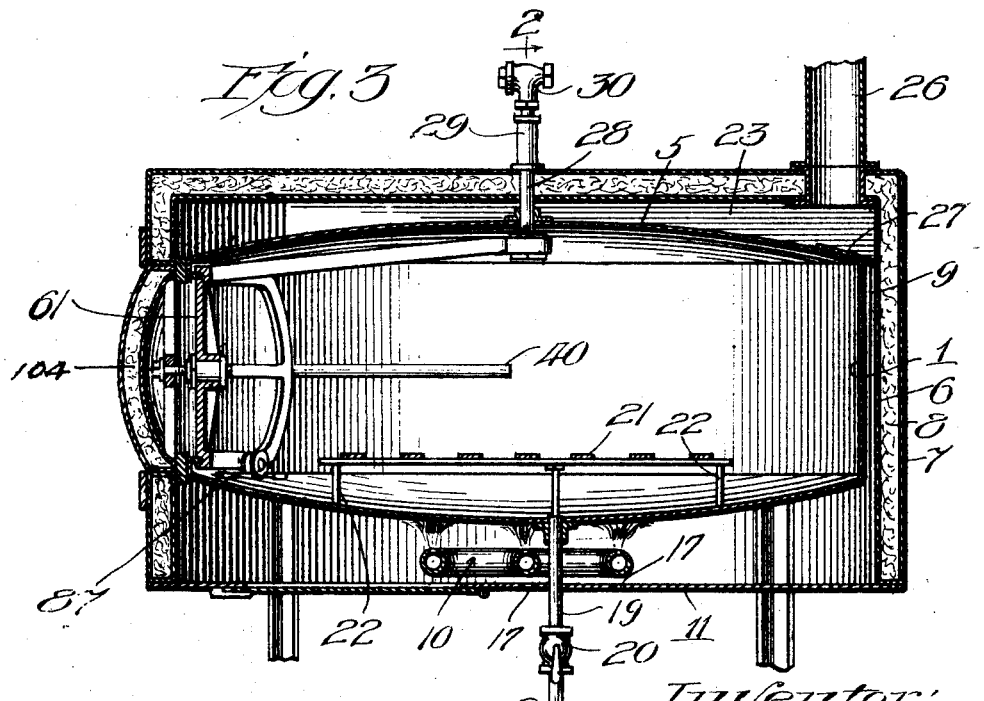

Feb. 19, 1929.
E. M. SIMONDS
1,702,854
METHOD OF PREPARING FOOD
Original Filed July 22, 1925    3 Sheets-Sheet 3
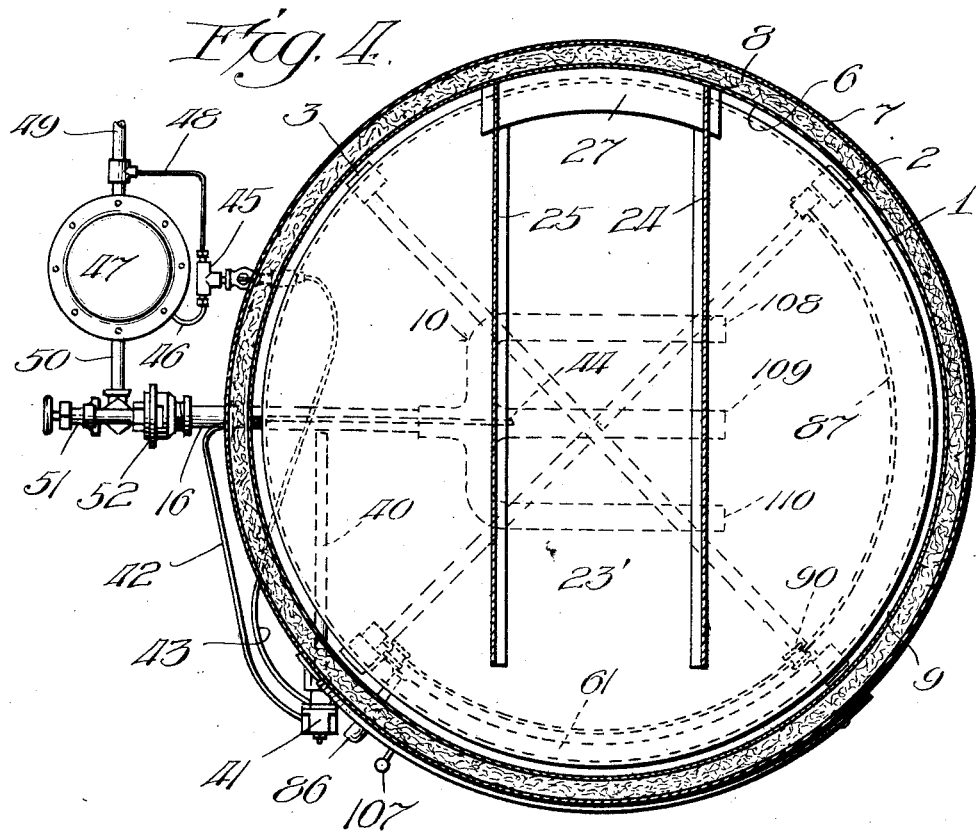

Patented Feb. 19, 1929.

1,702,854

UNITED STATES PATENT OFFICE.

EDMOND M. SIMONDS, OF WILMETTE, ILLINOIS, ASSIGNOR, BY MESNE ASSIGNMENTS, TO E. M. SIMONDS DEVICES COMPANY, A CORPORATION OF ILLINOIS.

METHOD OF PREPARING FOOD.

Application filed July 22, 1925, Serial No. 45,175. Renewed March 12, 1928.

This invention relates to a method of preparing food by cooking.

The general object of the invention is the provision of such a method whereby the desired cooking may be accomplished in a period considerably shorter than is required in methods now generally in use, without producing undesirable effects upon or within the food.

Another object is the provision of such a method whereby the cooking may be thus accomplished in a short period, and the food turned out with an attractive appearance and improved savor, flavor and redolence.

Yet another object is the provision of a method whereby food may be cooked quickly and thoroughly without either undesirable shrinking or moisture loss, or undesirable or excessive absorption or occlusion of moisture.

Still another object is the provision of a method productive of results specified above and which may be employed in the preparation of a considerable variety of foods and by which uniformity in the desired cooking effects on a given article may be obtained.

Still another object is the provision of such a method by which a desired surface browning effect as well as a thorough internal cooking may be obtained when desired.

Yet another object is the provision of a method which is susceptible of definite control and may be carried on with automatic control, to produce the desired results, without requiring supervision or periodic inspection of the food during the progress of the cooking.

A further object is the provision of such a process which may be carried on economically and with facility and safety.

Other and further objects will be pointed out or indicated hereinafter, or will appear to one skilled in the art upon an understanding of the invention or its employment in practice.

For the purpose of aiding in an explanation of the process, I disclose in the accompanying drawings forming a part of this specification, a form of apparatus which may be employed in its practice, but it is to be understood that this is presented for purpose of illustration only, as the process is not limited in its practice to the form of apparatus herein disclosed.

In said drawings

Fig. 2 is a part sectional elevation of same taken transversely of the apparatus as shown in Fig. 1, or on line 2—2 of Fig. 3;

Fig. 3 is a part sectional elevation on line 3—3 of Fig. 1;

Fig. 4 is a cross section on line 4—4 of Fig. 2;

Figure 1:
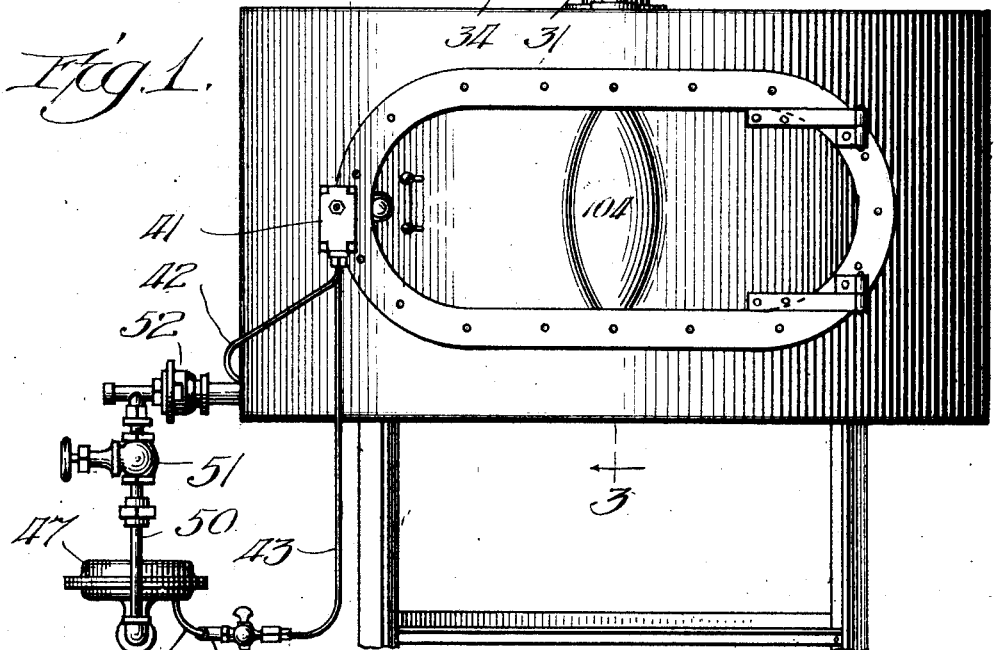
Fig. 1 is an elevational view of a cooking apparatus.
Figure 5:
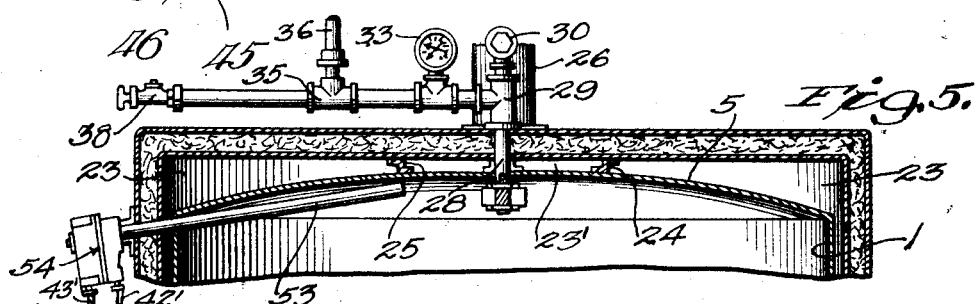
Fig. 5 is a part sectional elevation corresponding to the upper portion of Fig. 2 but with a control element added.

Among the practices employed in the cooking of foods are those familiarly known as "boiling," "baking" or "roasting" and "steaming." While, so far as I know, these terms, as applied in the culinary art, have no established or scientifically specialized significances, the term "boiling" is used to indicate a procedure wherein the heat is applied to the material to be cooked through the medium of a body of liquid, commonly water, in which the material is immersed, and incident to which procedure the material usually loses more or less of its flavoring juices and soluble constituents which are desirable in the food, and takes up more or less of the water. The terms "baking" or "roasting" are commonly used to designate a procedure wherein the material is subjected to heat transmitted through air, and is ordinarily accompanied by a greater or less extraction of moisture from the material by evaporation but without dilution of the juices and with retention of a higher proportion of the soluble albumins than with boiling. The term "steaming" is commonly employed to designate a procedure wherein the material is subjected to contact with wet steam, incident to which the material may take on more or less moisture of condensation from the steam with consequent dilution of juices, or may give up moisture by evaporation and the passing of the wet steam away from contact with the material. In one respect, therefore, the effects produced in baking or roasting differ from boiling and steaming by a drying, and sometimes a browning, of the external surface portions of the material in excess of internal portions. The present invention has to do more particularly with the obtaining of effects corresponding to those resulting from baking or roasting,—in the particular that additional moisture is not taken up by the food,—but with a very substantial reduction of the cooking periods from those now commonly recognized as necessary with the procedures now generally in use, and with an appreciable betterment in the gustatory qualities of the food and the avoidance of loss by excessive drying and shrinkage, over-cooking, and excessive divergence or non-uniformity of cooking as between different portions of a given piece.

Described generally, the invention involves a process wherein the article of food to be cooked is maintained in a heated atmosphere which is at an effective cooking temperature and of such nature as to inhibit or limit the evaporation of moisture from the food without adding moisture to it, and at the same time such as to afford a medium through which a high temperature may be transmitted to the food for the period of time necessary to cook it to the desired extent, heat being applied to the food through this atmosphere and at a temperature higher than that of the atmosphere, with a practically uniform distribution. As an example of the manner in which the process may be carried out, I may take an article of food, say a roast of beef, and support it in a closed pressure-retaining receptacle in such fashion that all sides of the receptacle are out of contact with the roast, so as to reduce to a negligible or minimum degree the amount of heat transferred by direct conduction from the receptacle to the meat. I confine in the receptacle, with the meat, a quantity of water suitable to generate a volume of saturated steam sufficient to displace the confined air. Heat is then applied to the exterior of the confining walls of the receptacle in an amount and at a temperature sufficient to generate from the confined moisture a volume of saturated steam such as to fill the receptacle, the air being vented from the receptacle and expelled by the pressure of the steam. By continued application of heat to the exterior of the walls of the receptacle, and temperature is maintained at a degree in excess of the temperature of the confined saturated steam, the temperature of the steam being maintained approximately constant by regulating it to constant pressure, as by decreasing or increasing the amount of heat applied to the receptacle. The heat applied is of such amount as to maintain the steam in a dry condition and to prevent condensation on the interior surfaces of the receptacle, with the result that the confined atmosphere is maintained in a condition in which it has a high degree of diathermancy. Thus, with the temperature of the walls of the receptacle at a proper degree, rays of radiant heat are projected therefrom onto and into the roast, the sensible temperature of which radiant heat upon the roast may be made to exceed the temperature of the confined steam to any extent desired for the cooking. By providing these heat radiating surfaces with a suitable contour and a suitable distribution of the heat applied externally to them, a practically uniform distribution of the effectiveness of the radiant heat upon the exposed surfaces of the roast may be obtained. As a result of the procedure described above, the cooking of the roast with the desired uniformity and thoroughness and with the desired surface browning may be accomplished very rapidly, as compared with the processes of baking and roasting now generally followed, and without excessive shrinking or dehydration on the one hand, or absorption of moisture on the other. While I have indicated above that water is placed in the receptacle to provide a source for the steam, it will be understood that the steam may be derived in whole or in part from the moisture contained in the roast, the important factor being that there be sufficient moisture available in the receptacle to maintain about the roast an atmosphere which will retard or inhibit to a desired degree the rapid or excessive extraction of moisture from the roast by the heat applied to it.

Figure 6:
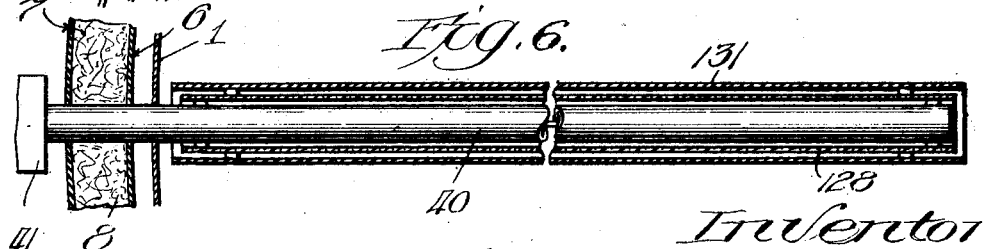
Fig. 6 is a broken longitudinal sectional view of one form of control element.

A more detailed understanding of the process may be ascertained from a description of it in reference to a form of apparatus by which it may be practiced and of which one example is shown in the accompanying drawings. In these the reference numeral 1 designates a pressure-confining receptacle in which the food is cooked. In the particular apparatus here shown this is in the form of a metallic shell of good heat radiating character and having a cylindrical side wall, a dished bottom wall 4 and a crowned or dome-shaped top wall 5. It is housed within an enveloping insulating jacket having inner and outer wall portions 6 and 7 with insulating material therebetween, and is spaced from the side and top walls of the receptacle to afford intervening spaces 9 for circulation of gases of combustion from the burner 10. The jacket may be partially closed below the receptacle 1 by a bottom 11, and its inner wall 6 may have a polished finish to decrease conduction of heat through it and to increase radiation onto the wall of the receptacle 1. The bottom 11 is provided with appropriate openings 15 and 17 for supplying combustion air to the burner. A drain pipe 19 controlled by a valve 20 is shown connecting with the low point of the bottom 4, as a drainage outlet. A grid 21 is shown supported above and out of contact with the bottom wall by legs 22. Partition members 24 and 25 are shown partly subdividing the space between the receptacle and the jacket, for directing the course of the combustion gases through channels or compartments 23 and 23' to an outlet stack 26, and a baffle plate 27 is shown arranged immediately under the stack, for the purpose of contributing to distribution of the gases. An outlet pipe 28 leads from the chamber of the receptacle to a connection 29, to which are connected an automatic valve 30, hand operable valve 38 and indicating instruments 33 and 36. A detecting device 40, which may be responsive to either pressure or temperature, is positioned in the receptacle 10 and has operative connection with a pilot valve device 41, which controls flow of gas from a tube 43 to a tube 42 leading from the pilot light 44. An automatic valve device 47, of a familiar type operating in accordance with the differential of pressures on opposite sides of an actuating diaphragm, controls the flow of gas from the supply line 49 to the burner connection 50, whence the gas is supplied to the air-mixing device 52 and the burner tube. The pressure differential effective on the automatic valve 47 is that between the pressure in line 49 and that in a by-pass tube 46 which is in connection with the tube 43. Assuming the detecting element 40 to be responsive to pressure in the receptacle 1, the arrangment is such that as the pressure in the receptacle 1 approaches a predetermined value, the pilot valve will be given a closing movement to diminish flow through tube 43 and thus permit pressure to build up through tube 46 and on the side of the regulator diaphragm to give the automatic valve a closing movement. This results in the cutting down of the gas supply to the burner and a reduction in the amount of heat applied to the receptacle. With a decrease of pressure in receptacle 1 from the predetermined value, the detecting element 40 gives the pilot valve 41 an opening movement, resulting in an increased flow from tube 43 to tube 42 and a decrease in the holding-down pressure in the automatic regulator 47, so that the gas valve is given an opening movement and the heat from the burner increased. As indicated above, the detecting element 40 may be one which is responsive to the atmospheric temperature in receptacle 1, in which case it is provided with suitable shielding means, such as indicated at 128 and 131 in Fig. 6, so constructed and arranged as to shield the heat-responsive element from radiant heat emanating from the walls of the receptacle. Similarly, for control of the temperature of the radiant heat emanating from the receptacle walls, a thermostatic device 53, responsive to the radiant heat in receptacle 1, may be arranged to control a second pilot valve device 54 which controls the flow through tubes 43' and 42' to govern the differential pressure of another regulating valve which controls the supply of gas to the burner, as above described with reference to the automatic valve 47.

Access is had to the interior of receptacle 1 through a side opening which may be closed air tight by a door 61 arranged to travel circumferentially within the chamber on a track 87. An external door 104, suitably heat insulated, is hinged on the outer jacket and arranged to close a lateral opening therein in front of the door opening of the receptacle 1.

In the practicing of the process with the apparatus herein disclosed, the doors are opened and the article, in a suitable shallow pan 120, is placed on the support 21. Thus, it will be seen, the article is supported out of contact with any portion of the receptacle walls. A suitable quantity of water is placed in the receptacle, either in the dished bottom, or in the pan, or if the article itself contains sufficient water, such need not be supplied additionally. The doors are then closed, the inner door forming a seal which will retain pressure in the receptacle. The burner is then lighted or turned up, and the hot gases travel up along the bottom and up in contact with the side and over the top through the channels 23 and 23' to the stack. Thus all walls of the receptacle are rapidly heated and the temperature of the contents of the receptacle raised. The confined moisture is converted into steam which expels the air through the automatic valve 30, which valve closes when the fluid passing out reaches a predetermined temperature. The continued application of heat to the walls of the receptacle continues the generation of the steam from the confined moisture and the heating of the steam until it reaches the pressure desired and which the pilot valve device 41 is set to maintain. As the pressure of the steam approaches the critical amount, the detecting element 40 will actuate the pilot valve 41 to decrease the supply of fuel to the burner and thus decrease the heat supplied to the receptacle, all in the manner above pointed out, so that the steam will be held at the desired pressure. The confined steam, being subjected to the heat radiated from the walls of the receptacle will be maintained in a dry condition, and in the presence of the unevaporated liquid and moisture will remain substantially saturated. Thus, upon the desired operating pressure being reached by the confined steam, the evaporation of moisture from the material will be definitely limited. The steam, being maintained in a dry condition, is efficiently diathermanous, so, in addition to being subjected to the heat of the steam itself, the material will be subjected to the radiant heat rays emanating from the walls of the receptacle. By providing the receptacle walls with proper contour and a proper spacing with respect to the support, a concentration of the heating effect of the radiant rays may be secured in the appropriate locations to obtain a practically uniform radiant heat distribution on the material being cooked.

In this fashion, the material is maintained in a diathermanous atmosphere which is effective to inhibit or limit the evaporation or absorption of moisture from it, while the material is subjected to the higher temperature of the radiant heat. As a consequence, heat may be applied to the material in a manner which will accomplish the cooking quite rapidly, without the surface portions of the material being excessively dried or overcooked. It will be understood that during the cooking, the material is subjected to the heat effects of both the contained atmosphere and the heat rays or radiant energy emanations from the walls of the receptacles, so that the cooking influences of both are availed of. Different temperatures and different pressures, appropriate for different food materials may be employed. By control of the applied heat by the thermostatic member 53, desired variations as between the temperature of the radiant heat and the temperature of the confined atmosphere may be obtained, and at the end of the cooking period the radiant heat may be raised to effect a quick browning of the surface.

By this process the food may be quickly cooked with the desired completeness without over-cooking or excessive dryness of outer portions as compared to inner portions, and without loss or dilution of flavor-imparting and nutritious constituents or excessive shrinkage or disintegration. Vegetable foods, as well as meats, may be prepared by this process with advantages mentioned above, advantages being particularly apparent in retention of more natural coloring and form and better flavor as compared with such foods which have been cooked by boiling.

What I claim is:

1. The method of cooking food material, comprising subjecting the material to heat and pressure, rendering the gases and vapors surrounding said material diathermanous, and directing non-luminous heat rays therethrough and upon and into said material.

2. The method of cooking food material, comprising subjecting the material to heat and pressure, rendering the gases and vapors surrounding said material diathermanous, directing non-luminous heat rays therethrough and upon and into said material, and equalizing the effectiveness of said rays on different parts of said material.

3. A method of cooking food, comprising subjecting the food to cooking heat by convection and to pressure, applying additional heat to the food in the form of non-luminous heat rays, and concentrating said rays at given loci.

4. A method of cooking food, comprising subjecting the food to cooking heat by convection and to super-atmospheric fluid pressure, applying additional heat to the food in the form of radiant heat rays, and regulating the amount of radiant heat by the temperature of the pressure fluid surrounding the food.

5. A method of cooking food, comprising subjecting the food to cooking heat by convection and to super-atmospheric pressure, and applying additional heat to the food by radiant heat rays, directing said rays with different concentrations on different portions of the food.

6. In a process of cooking food in the presence of a heated atmosphere under pressure, the steps of maintaining the atmosphere in contact with the food in a diathermanous and saturated condition, and passing radiant heat rays through said atmosphere to said food.

7. In a process of cooking food in the presence of heated atmosphere under pressure, the steps of maintaining the atmosphere in contact with the food in a diathermanous and saturated condition, passing non-luminous heat rays through said atmosphere to said food, and varying the effective intensities of said rays.

8. A method of cooking food material which comprises confining a substantially saturated and efficiently diathermanous atmosphere in contact with the material and projecting radiant heat through said atmosphere onto the material.

9. A process of cooking food material which comprises confining a substantially saturated and efficiently diathermanous atmosphere under pressure in contact with the material and projecting radiant heat through said atmosphere onto the material.

10. A process of cooking food material which comprises maintaining the material confined in an atmosphere of dry saturated steam under super-atmospheric pressure while projecting radiant heat onto the material through said atmosphere.

11. A method of cooking food material which comprises confining a heated and substantially saturated and efficiently diathermanous atmosphere in contact with the material and projecting radiant heat through said atmosphere and onto the material throughout the cooking period.

12. A method of cooking food material which comprises maintaining a dry but substantially saturated and heated atmosphere in contact with the material and under pressure while projecting radiant heat onto the material through said atmosphere.

13. A method of cooking food material which comprises maintaining a dry saturated steam in contact with the material while projecting radiant heat onto the material through the steam and regulating the temperature of the radiant heat by the pressure of the steam.

14. A method of cooking food material which comprises maintaining the material in the presence of a substantially saturated and efficiently diathermanous atmosphere, maintaining said atmosphere at a cooking temperature, and at the same time projecting radiant heat through said atmosphere and upon the material at a temperature in excess of that of said atmosphere.

15. A method of cooking food material which comprises maintaining the material confined in and in contact with an atmosphere of dry saturated steam at a cooking temperature while projecting radiant heat through said amosphere and onto the material at a temperature in excess of that of the steam.

16. A method of cooking food material which comprises maintaining the material confined in and in contact with a substantially saturated diathermanous atmosphere of a cooking temperature while projecting radiant heat at a higher temperature through said atmosphere and in a substantially uniform distribution upon the material.

17. A method of cooking food material which comprises maintaining the material confined in the presence of an atmosphere of dry saturated steam at a constant pressure while projecting radiant heat through said atmosphere and upon the material at a temperature in excess of that of the steam.

18. A method of operating a retort for the cooking of food, which comprises confining the food in the retort but out of contact therewith, generating a pressure atmosphere of saturated steam in the retort and in contact with the food by application of heat to the walls of the retort, and maintaining the steam in a dry condition by keeping the walls of the retort in contact therewith at a temperature higher than that of the steam.

19. A method of operating a retort for the cooking of food, which comprises confining the food in the retort but out of contact therewith, maintaining a pressure atmosphere of steam in the retort in enveloping contact with the food, maintaining said steam in a substantially saturated condition, applying heat to the walls of the retort in quantity adequate to maintain them at a temperature above that of the steam and keeping the food exposed to radiant heat emanating from the retort walls.

20. A method of cooking food material, which comprises confining the material and holding in contact with it an atmosphere which is of a cooking temperature and substantially devoid of free moisture yet of a nature to inhibit free evaporation of moisture from the material, and subjecting the material to the influence of radiant heat projected through said atmosphere and of a temperature in excess of that of the said atmosphere.

21. A method as specified in claim 20 and wherein the said atmosphere is maintained under pressure.

In witness whereof, I hereunto subscribe my name to this specification.

EDMOND M. SIMONDS.